United States Patent [19]
Ciarico

[11] 3,871,231
[45] Mar. 18, 1975

[54] FLOW MEASURING DEVICE
[75] Inventor: Anthony J. Ciarico, Waukegan, Ill.
[73] Assignee: The Kendall Company, Walpole, Mass.
[22] Filed: May 14, 1973
[21] Appl. No.: 360,217

[52] U.S. Cl. .................. 73/215, 128/2 F, 128/295
[51] Int. Cl. ............................................. G01f 1/00
[58] Field of Search.......... 73/215, 216, 290 R, 428; 128/2 F, 275, 295

[56] References Cited
UNITED STATES PATENTS

| | | | |
|---|---|---|---|
| 963,150 | 7/1910 | Howell................................ | 73/215 |
| 1,042,097 | 10/1912 | Englebright......................... | 73/215 |
| 1,161,279 | 11/1915 | Anderson............................ | 73/215 |
| 1,992,780 | 2/1935 | Skeats................................. | 73/215 X |
| 2,012,601 | 8/1935 | Flood.................................. | 33/126.7 R |
| 2,165,705 | 7/1939 | Houser................................ | 73/215 |
| 2,648,981 | 3/1953 | Drake, Jr............................ | 73/215 |
| 3,058,353 | 10/1962 | Irwin................................... | 73/428 |
| 3,211,195 | 10/1965 | Porter................................. | 141/331 X |
| 3,466,145 | 9/1969 | Duyne................................ | 23/253 R |
| 3,488,855 | 1/1970 | Howe.................................. | 33/126.7 R |
| 3,527,251 | 9/1970 | Hagstrom et al. ................. | 73/215 X |

FOREIGN PATENTS OR APPLICATIONS

| | | | |
|---|---|---|---|
| 94,707 | 5/1922 | Switzerland......................... | 73/215 |
| 591,987 | 1/1934 | Germany............................. | 73/215 |

Primary Examiner—Richard C. Queisser
Assistant Examiner—John P. Beauchamp
Attorney, Agent, or Firm—Powell L. Sprunger

[57] ABSTRACT

A device for measuring the approximate peak flow of a liquid discharge, including a body member having an inlet opening adjacent the top of the member to receive the liquid discharge, and a cavity extending from the inlet opening through the member. A plate extends across the body member in the cavity below the inlet opening, and the plate has an aperture extending through the plate for passage of liquid. A plurality of tubes extend upwardly from the plate toward the inlet opening, with each of the tubes having different lengths and communicating with the remote side of the plate relative the inlet opening for passage of liquid in the tubes through the plate. The device has means for indicating the maximum height of liquid reached in the body member during the liquid discharge for determining the approximate peak flow rate of the discharge. The liquid passes from the body member to a receptacle for collection therein, and the total volume of the discharge may also be determined by indicia on the receptacle.

11 Claims, 8 Drawing Figures

PATENTED MAR 18 1975 3,871,231

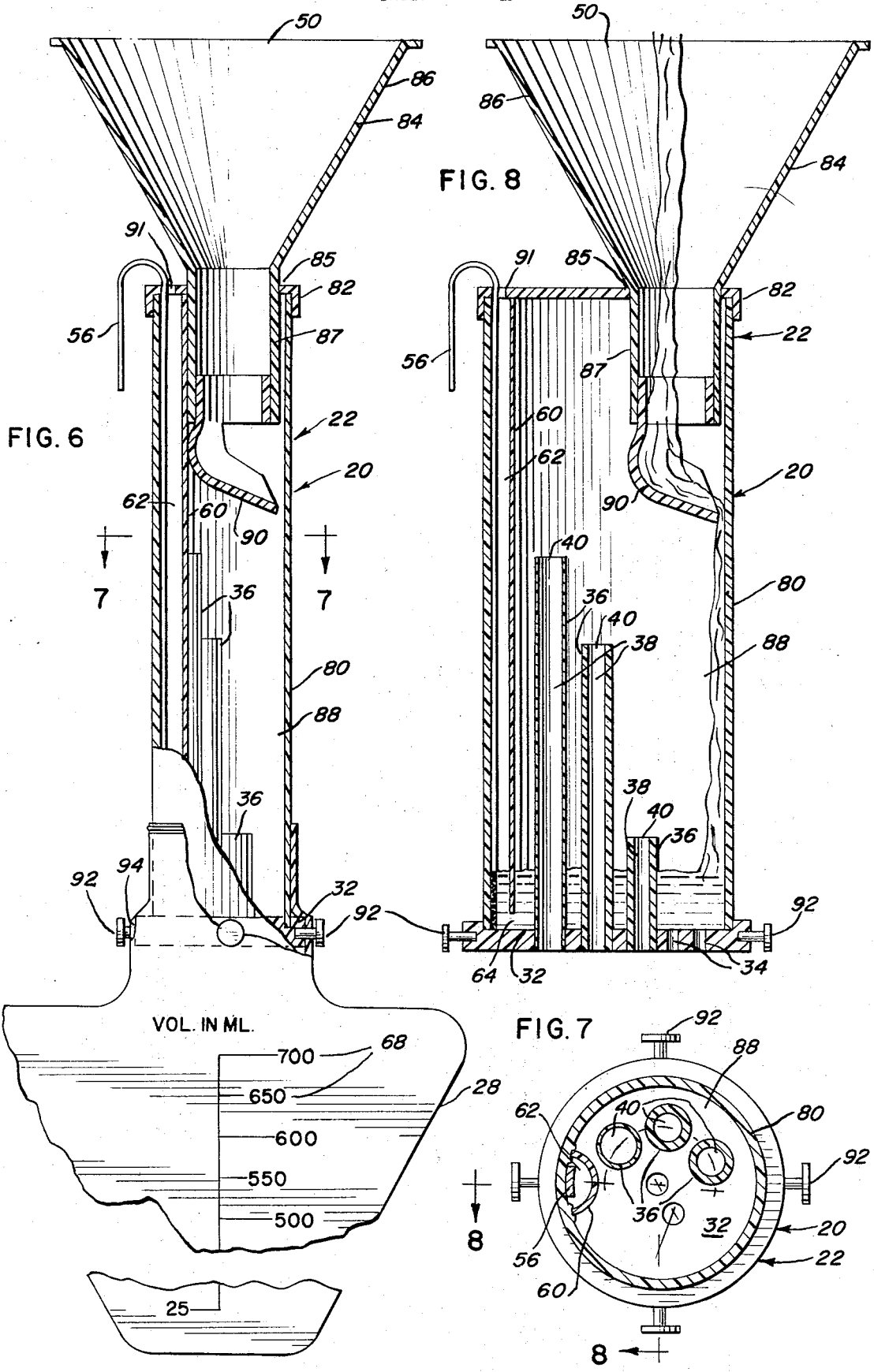

FLOW MEASURING DEVICE

CROSS-REFERENCE TO RELATED APPLICATIONS

"Apparatus for Measuring a Liquid Discharge," Ser. No. 360,218, filed May 14, 1973, invented by William J. Binard, John F. Dye, and Leonard R. Anglada, and assigned to the assignee of the present application; "Flow Measuring Apparatus," Ser. No. 360.214, filed May 14, 1973, invented by John F. Dye, William J. Binard, and Leonard R. Anglada, and assigned to the assignee of the present application; "Time Measuring Device," Ser. No. 360,213, filed May 14, 1973, now Pat. No. 3,831,446, invented by John F. Dye, and assigned to the assignee of the present application; and "Flow Measuring Apparatus Having a Colorimetric Urine Indicator," Ser. No. 360,235, filed May 14,1973, invented by Shu-Sing Cheng, and assigned to the assignee of the present application.

BACKGROUND OF THE INVENTION

1. Field of the Invention

This invention relates to liquid measuring devices, and more particularly to a device for measuring the peak flow rate of a liquid discharge.

2. Description of the Prior Art

In the past, it has been found desirable to obtain various data pertaining to a liquid discharge. In particular, it has been discovered that in many urological cases problems relating to the bladder and urethral tract may be readily diagnosed by analyzing information obtained during natural voiding of urine. Presently, various types of devices are utilized to obtain data on the urine stream, such as total volume, average flow rate, force, velocity, and configuration of the stream.

Most of these devices have suffered from less than total reliability because they have required the presence of one or more observers while the patient is voiding. It is obvious that such administration of the devices in this manner create sufficient physchological difficulties for many patients to effect voiding. Consequently, if the patient voids at all, the potentially erroneous data obtained may result in a false diagnosis and a loss of confidence in the device by the physician. A further complication results from the fact that many of these devices are rather bulky, and somewhat difficult to use.

Coanda U.S. Pat. No. Re. 26,964 shows a container which measures the volume of urine over a period of time. De Bella U.S. Pat. No. 3,362,400 discloses a device for measuring specific gravity and the volume of liquid collected over a period of time. Lane, Jr. U.S. Pat. No. 3,499,327 discloses a device to divert the beginning and middle portions of the urine stream into separate chambers. Profy U.S. Pat No. 3,561,427 relates to a device which collects urine in a plurality of rotating containers over a period of time. The related applications "Flow Measuring Apparatus" and "Apparatus for Measuring a Liquid Discharge" disclose devices which measure the peak flow rate of a liquid discharge.

SUMMARY OF THE INVENTION

A principal feature of the present invention is the provision of a device of simplified construction for measuring the approximate peak flow rate of a liquid discharge, and which may be self-administered by a patient.

The measuring device of the present invention includes a body member having an inlet opening adjacent the top of the member to receive the liquid discharge, and a cavity extending from the inlet opening through the member. A plate extends across the body member in the cavity below the inlet opening, and the plate has an aperture extending through the plate for passage of liquid. A plurality of tubes extend upwardly from the plate toward the inlet opening, with each of the tubes having different lengths and communicating with a remote side of the plate relative the inlet opening for passage of liquid in the tube through the plate. The device includes means for indicating the maximum height of liquid reached in the body member during the liquid discharge. The liquid passes from the body member to a receptacle for collection therein.

A feature of the invention is that the peak flow rate of the liquid discharge into the body member may be determined by the indicating means.

Another feature of the invention is that the total volume of the discharge may be determined by indicia on the receptacle.

Further features will become more fully apparent in the following description of the embodiments of this invention and from the appended claims.

DESCRIPTION OF THE DRAWINGS

In the drawings:

FIG. 6 is a fragmentary elevational view, taken partly in section and partly broken away, of another embodiment of the flow measuring device of the present invention;

FIG. 7 is a sectional view of the flow measuring device of FIG. 6, taken substantially as indicated along the line 7—7 of FIG. 6; and FIG. 8 is a sectional view of the flow measuring device of FIG. 6, taken substantially as indicated along the line 8—8 of FIG. 7.

DESCRIPTION OF THE PREFERRED EMBODIMENT

Figure 1:
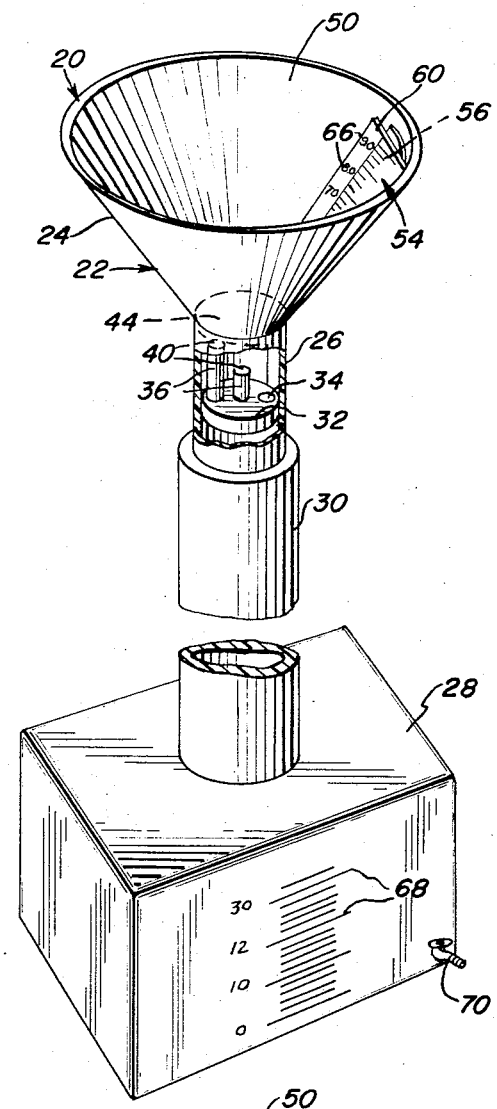
FIG. 1 is a fragmentary perspective view, partly broken away, of a flow measuring device of the present invention as connected to a container.

Referring now to FIG. 1, a device, generally designated 20, is shown for measuring the peak flow rate of a liquid discharge, such as a urine stream during voiding. The device 20 includes a funnel-shaped body member designated generally 22 having an upper tapered portion 24 to receive the liquid discharge, and a lower depending tubular portion 26. The body member 22 may be made of any suitable material, such as plastic, and is preferably transparent. The body member 22 may be connected to a lower container or receptacle 28 below the body member through a conduit 30 communicating with the tubular portion 26 and the container 28.

Figure 2:
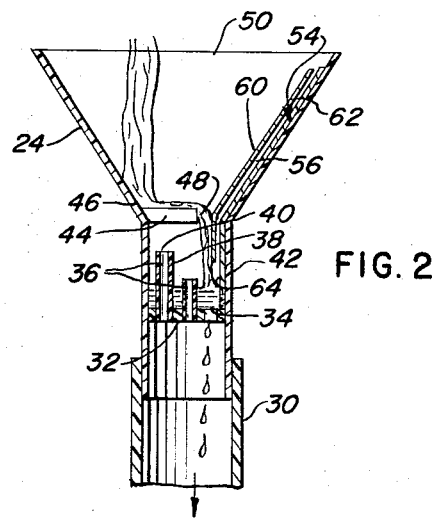
FIG. 2 is a sectional view of the flow measuring device of FIG. 1, during initiation of a liquid discharge into the device.

As illustrated in FIGS. 1 and 2, a plate 32 extends across the tubular portion 26 of the body member 22, and the plate has an aperture 34 extending through the plate 32. A plurality of tubes 36 extend from the plate 32 upwardly toward the top of the body member 22, and each of the tubes has a lumen 38 communicating between both sides of the plate 32. Also, each of the tubes 36 have different lengths in order to define a plurality of ports 40 at differing heights above the plate 32 in the body member 22. Preferably, the aperture 34 is located adjacent a side 42 of the body member 22, and a baffle 44 extends from the other side 46 above the tubes 36. The baffle 44 has an outer edge 48 positioned above the aperture 34 for a purpose which will be described below.

Figure 3:
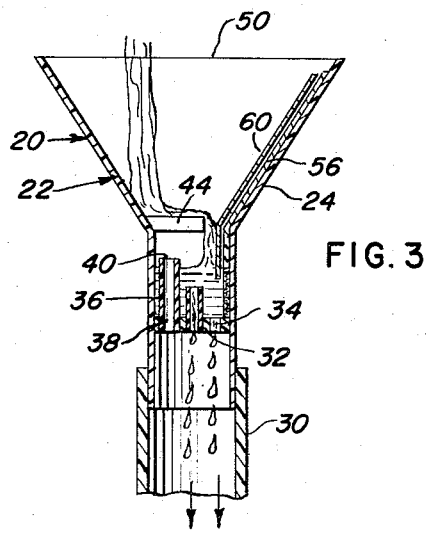
FIG. 3 is a sectional view of the flow measuring device of FIG. 1, showing the rise of liquid level in the device during an increase in flow rate of the liquid discharge.
Figure 4:
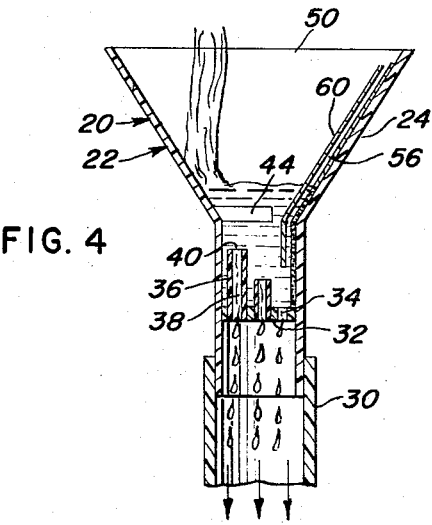
FIG. 4 is a sectional view of the flow measuring device of FIG. 1, showing the rise of liquid level in the device at the peak flow rate of the liquid discharge into the device.

In operation, the device 20 is positioned to receive a liquid discharge, such as the urine stream during voiding, through an inlet opening 50 defined by the upper end of the tapered portion 24 of the body member 22. As the liquid enters the tapered portion 24 of the body member 22, it strikes the baffle 44 which breaks the force and velocity of the discharge and directs the discharge in a stream over the outer edge 48 of the baffle 44 toward the aperture 34. As liquid falls from the baffle onto the plate, the liquid first passes through the aperture 34, the conduit 30, as indicated by the direction of the arrows in the drawings, and into the container 28 for collection. However, when the rate of flow of the liquid discharge into the device sufficiently increases, the flow of liquid through the aperture 34 will not immediately dissipate the liquid collecting above the plate 32, and the height of the liquid above the plate begins to rise. If the rate of flow of the liquid discharge is sufficiently high, the accumulation of liquid above the plate 32 will reach a level above the lower tube, as shown in FIG. 3. Accordingly, the liquid then begins to pass through the lumen of the lower tube as well as the aperture for collection in the container 28. Since liquid above the plate 32 now passes through both the aperture 34 and the lower tube, a greater increase in the rate of flow of the liquid discharge into the body member 22 is necessary to accomplish a further raise of height of liquid above the plate 32. However, if the rate of flow of the liquid discharge into the body member 22 is sufficiently large, the height of liquid collecting above the plate 32 will continue to rise and may ultimately pass through higher tubes in the body member. As shown in FIG. 4, the rate of flow of the liquid discharge may attain a sufficiently large value such that the liquid collecting above the plate rises to a height above all the tubes 36 and the baffle 44.

Figure 5:
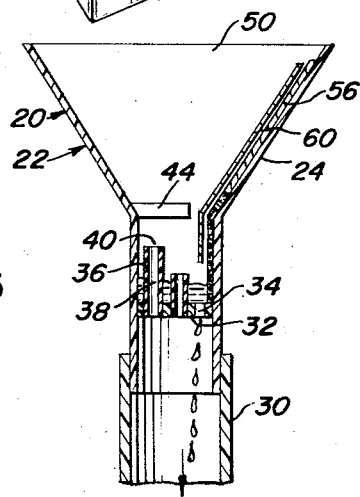
FIG. 5 is a sectional view of the flow measuring device of FIG. 1, after the discharge of liquid into the device has discontinued and the height of liquid in the device has abated.

Once the rate of flow of the liquid discharge into the body member has abated, the height of the liquid column in the body member above the plate 32 begins to subside, and when the discharge into the members terminates, the remaining liquid above the plate 32 drains through the plate and into the container 28, as shown in FIG. 5.

Means 54 is provided on the inside of the body member 22 for indicating the maximum height of liquid reached in the body member above the plate during the liquid discharge, as shown in FIGS. 1 and 2. In a preferred embodiment, the indicating means 54 comprises a strip of liquid indicating material 56 which extends from the plate 32 toward the inlet opening 50 adjacent the top of the body member 22. The indicating strip 56 may be made of a wettable material, such as a material which changes color upon contact with the liquid, for example, a methylene blue compound or rhodamine may be used on the strip 56. Flow Measuring Apparatus Having a Colorimetric Accordingly, the maximum height of liquid reached in the body member 22 can be determined by observing a change in the material 56 after the discharge has passed through the body member 22. This change in the indicating strip is designated in the drawings by the darkened portion of the strip in FIGS. 2-5. A flange 60 covers the material 56 and shields it from the incoming liquid discharge, in order to prevent an erroneous reading of the height obtained by the liquid column. The flange 60 is spaced slightly from the material 56 to define a channel 62 between the flange 60 and the outer wall of the body member 22. The flange 60 terminates at its lower end above the plate 32 in order to define an opening 64 for passage of liquid into the channel 62 as the liquid rises above the plate 32 during voiding. If desired, the indicating strip 56 may be removably positioned in the channel 62, such that the strip 56 may be inserted into the channel 62 from the upper end of the body member, and the device may be reused, if desired.

Peak flow rate of the incoming liquid discharge may be defined as the the maximum rate of flow of the discharge. Since the height of liquid in the body member raises or lowers responsive to an increase or decrease, respectively, of the flow rate of the incoming discharge, it is apparent that the maximum height of liquid attained in the body member during the discharge serves as an indication of the approximate peak flow rate of the discharge. Although anomalies in the discharge, such as a momentary surge of the discharge, may not be ultimately reflected in the maximum liquid height in the body member, due, in part to the lag between the time the discharge enters and subsequently passes through the body member, the device may be used to determine the peak flow rate with sufficient accuracy for such purposes as are under discussion. In particular, a urine stream during voiding has a relatively slow rate of change of flow rate, and the device of the present invention indicates a peak flow rate for the discharge which is sufficiently accurate for purposes of diagnosing a patient.

Accordingly, after voiding is complete and the liquid has passed through the body member, the material 56 indicates the maximum height the liquid has reached in the body member during voiding, and the approximate peak flow rate may be determined by indicia 66, as shown in FIG. 1, on the body member or on the indicating strip itself, if desired. Thus, the maximum height of change in the indicating material 56 is compared against the indicia to determine the approximate peak flow rate of the discharge.

As is apparent, the rate of flow of the liquid passing through the measuring device is affected by its particular structure. For example, the size of the orifice 34 and the lumens 38 in the tubes 36 control the rate of flow of liquid through the plate 32. Similarly, the cross sectional area of the body member above the plate 32, and the length of the tubes 36 also affect the rate of flow of the liquid through the plate. Accordingly, these parameters in the structure may be selected to achieve a more accurate determination of flow rate in the expected range of values for the peak flow rate of the discharge. Once the structure has been established, the device may be readily calibrated by passing separate liquid discharges through the device with known constant flow rates, such that the peak flow rates of the separate discharges will equal their constant flow rates. The indicia 66 on the device may be marked accordingly.

Thus, the measuring device of the present invention provides a measurement of the approximate peak flow rate of a liquid discharge in a simplified manner, and may be self-administered by the patient. The patient simply voids through the inlet opening 50 of the body member 22, and when the voiding is complete, a physician or nurse may determine the approximate peak flow rate of the discharge by the highest level of liquid collected in the device during voiding, as indicated by the strip 56 and indicia 66.

Since the entire liquid discharge passes through the body member 22 into the container 28, the total volume of the liquid discharge may also be readily determined by the total volume of liquid collected in the container 28, as indicated by suitable indicia 68 on the container 28. If desired, a sample of the urine may also be obtained by removing the conduit 30 from the container 28, or through a valve 70 on the container 28.

Another embodiment of the invention is illustrated in FIGS. 6-8, in which like reference numerals designate like parts. As shown in FIGS. 6 and 8, in this embodiment the body member 22 has a collection member 80, which may have a cylindrical shape, as shown, a cap 82 secured to and covering the uppr end of the collection member 80, and a generally funnel-shaped member 84 removably positioned in an aperture 85 in the cap 82. The funnel-shaped member has an upper tapered portion 86 defining an inlet opening 50 and a depending sleeve 87. When the funnel-shaped member 84 is inserted through the cap 82, the depending sleeve 87 projects into a chamber 88 defined by the collection member 80. Preferably, a curved member 90 is secured to the lower end of the sleeve 87, and serves as means for directing the liquid discharge entering the funnel-shaped member 84 against the wall of the collection member and away from the ports 40 of the tubes 36, and for preventing splashing and foaming of the incoming discharge.

As the incoming liquid collects in the chamber 88, it passes through apertures 34 in a plate 32 and through the lumens 38 of tubes 36 in a manner similar to the device described in connection with FIGS. 1-5. A flange 60 in the collection member 80 defines a vertical channel 62, and an indicating strip 56 is inserted through an aperture 91 in the cap 82 and into the channel 62. Liquid passes from the chamber 88 into the channel 62 through an aperture 64 below the flange 60, and contacts the strip 56 to provide an indication of the approximate peak flow rate of the discharge. Indicia (not shown) may be provided on the wall of the collection member 80 adjacent the strip 56 to facilitate a direct determination of the peak flow rate after the discharge has been completed.

A container or bag 28 may be removably secured to the lower end of the collection member 80, as shown. A plurality of outwardly projecting bosses 92 are received through apertures 94 in the upper portion of the bag or receptacle 28 to retain the bag in place on the body member 22. After completion of the liquid discharge, the receptacle 28 may be removed from the body member 22 to obtain a specimen, and the volume of the discharge may be determined by indicia 68, as previously described.

Although, for convenience, the body member 22 and member 84 are discribed as having a funnel shape, it is apparent that any suitable configuration may be utilized which carries out the purpose of the invention. For example, the tapered portion 24 or 86 may abe suitably shaped for use, depending upon the particular sex of the user.

The foregoing detailed description is given for clearness of understanding only, and no unnecessary limitations should be understood therefrom, as modifications will be obvious to those skilled in the art.

I claim:

1. A device for measuring the approximate peak flow rate of a liquid discharge, comprising:
   a body member having an inlet opening adjacent the top of the member to receive the liquid discharge, and a cavity extending from said inlet opening through the member;
   a plate extending across the body member in said cavity below the inlet opening, said plate having aperture means extending through the plate for passage of liquid;
   a plurality of tubes extending upwardly from the plate toward said inlet opening, each of said tubes having different lengths and communicating with the remote side of the plate relative said inlet opening for passing liquid in the tubes through the plate;
   means intermediate the inlet opening and said plate wettable for indicating the maximum height of liquid reached in the body member during the liquid discharge to determine the approximate peak flow rate of the discharge into the body member; and
   means for preventing the incoming liquid discharge from directly a substantial portion of the indicating means.

2. The measuring device of claim 1 including means for directing the liquid discharge away from said tubes.

3. The measuring device of claim 2 wherein said aperture is positioned adjacent a side of the body member, and said directing means comprises, a baffle extending from the other side of the body member above said tubes, said baffle having end edge above the aperture over which the discharge passes.

4. The measuring device of claim 1 wherein said indicating means comprises, a liquid indicating strip positioned on the inside of said body member and extending from said plate toward said inlet opening.

5. The measuring device of claim 4 including indicia on the body member indicating the peak flow rate of the liquid discharge determined by the maximum height of liquid reached in the body member as indicated by said strip.

6. The measuring device of claim 4 including a flange covering and spaced from said strip to shield the strip from the incoming liquid discharge, the lower end of the flange being spaced from the plate to permit entry of liquid between the plate anad material as liquid rises above the plate.

7. The measuring device of claim 1 including a receptacle communicating with the lower end of the body member for collecting the liquid discharge.

8. The measuring device of claim 1 wherein said body member has a generally funnel shape, said member including an upper tapered portion defining the inlet opening, and a lower tubular portion containing said plate and tubes.

9. The measuring device of claim 8 including a baffle extending from the wall of the body member adjacent the juncture of the tapered and tubular portions over said tubes.

10. The measuring device of claim 1 wherein said body member comprises, a collection member containing the plate and tubes, and a generally funnel-shaped member removably positioned in the upper portion of the collection member.

11. The measuring device of claim 10 including a curved member secured to the lower end of the funnel-shaped member to direct the discharge away from the tubes.

* * * * *